United States Patent Office 3,260,355
Patented July 12, 1966

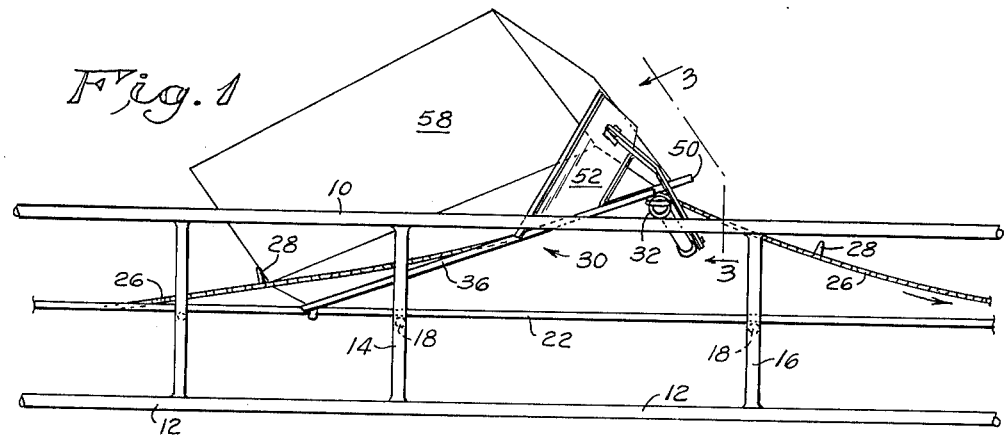

3,260,355
SELECTIVE UNLOADER FOR BALE CONVEYOR
Martin Mayrath, Dallas, Tex., and Samuel K. Stauth, Compton, Ill., assignors to Mayrath Company, a corporation of Illinois
Filed June 24, 1964, Ser. No. 382,681
1 Claim. (Cl. 198—185)

This invention pertains to conveyors of the type by which bales of hay, straw, forage or other farm products, or similar articles, can be moved along a desired path, such as into a storage building, and can be unloaded from the conveyor, to either side of the travel path, at any desired point along such path. The invention constitutes an improvement on the construction disclosed in U.S. Patent No. 3,135,376, issued June 2, 1964 in the name of Martin Mayrath.

In that prior patent, the conveyor was provided with an inclined ramp or the like, forming part of a carriage adapted to slide along the main side rails of the conveyor section, and which could be moved to any selected point along the length of the conveyor and secured in that position. Bales or the like which approach this ramp arrangement, under the driving force of a conveyor chain with the usual propulsion dogs or cleats, were caused to slide up the ramp to a level where they cleared the side rails. Under continued propulsion by the chain, they were then caused to slide off of the conveyor in a lateral direction, by the directive action of angled anti-friction rollers carried in support sockets and arranged so that the right- or left-discharge direction could be selected by inserting the roller supports at one angle or another in the sockets. The said prior invention caused the conveyor chain to ride upward along the ramp, so that it maintained driving contact with the bales until the latter had been raised sufficiently high to clear the side frames and be discharged, and it was a feature of that invention that the frictional engagement of the chain with the ramp arrangement could be employed to allow an operator to use it in moving the entire carriage and ramp structure to a new discharge location along the length of the conveyor section. However, it was necessary for an operator to climb up to the conveyor (usually far overhead) in order to change the roller angles, and thus to change from right-hand discharge to left-hand discharge.

The present invention provides a modified carriage and ramp construction which dispenses with the discharge rollers, and allows selective discharge of bales to either side of the conveyor path, by means that can readily be controlled, as by a pull rope, from a remote position or from far beneath the conveyor section. This is accomplished by means which retains the advantages of continuous driving engagement of the conveyor chain or dogs with the article (bale or the like) until it topples into the discharge path for gravity fall from the conveyor. Also, the present invention retains the feature of employing the chain's friction drag on the carriage to aid in moving the carriage to a new position along the conveyor.

Basically, the invention provides a carriage positionable lengthwise of the conveyor section, and including a pair of inclined ramps between which (and along a depressed track or guide section) the conveyor chain slides in the known manner. Each ramp, however, has pivoted thereon a diverter section that is movable between a downturned position, substantially flush with the general rising plane of its ramp, and an up-turned position, in which it rises much more sharply than the ramp plane itself. The pivot or hinge axes of the diverter sections are substantially at 45 degrees angles to the ramp-length direction as viewed from above, so that the raising of either diverted section in effect converts its appurtenant ramp upper surface to a dihedral angle whose rising wall is angled one way or the other (left or right) with respect to the lengthwise conveyor axis. Accordingly, when a bale reaches the ramp carriage, either its right or its left leading lower corner encounters one of the raised diverter panels, and as it continues to rise, the said corner is raised or tipped more rapidly than the opposite leading lower corner, with the ultimate result that the entire bale is toppled from the conveyor to the desired side of the conveying path. The two diverter panels or sections are interconnected so that when one is raised, the other is lowered, and the interconnecting means is arranged for control, especially from beneath, by a suitable rope or cable connected thereto.

The invention will be described in detail in connection with a preferred embodiment, to which no limitation is intended except such as may be required by the scope of the claims appearing at the end of this specification. In the drawings, FIG. 1 is a fragmentary side elevation of a portion of a conveyor section including the novel discharge carriage arrangement.

FIG. 2 is a plan view of the same.

FIG. 3 is a vertical sectional (and receding perspective) view of the invention, looking substantially along the direction indicated by arrows 3—3 in FIG. 1.

FIG. 4 is a fragmentary sectional view, to a larger scale, taken along line 4—4 of FIG. 2.

FIGS. 1 and 2 illustrate only so much of a typical conveyor section as is necessary for an understanding of the invention, and parts have been omitted, for clarity, where desirable. The conveyor section is shown as comprising (on the side visible in FIG. 1) an upper longitudinal frame bar 10 and a lower longitudinal frame bar 12, which may be tubular and connected at their ends as indicated in the prior patent mentioned above, or as also shown in U.S. Patent No. 2,951,577 to Wilcoxen. Transverse (vertical) struts such as 14, 16 brace these frame bars to one another. It will be understood that the far side of the conveyor section (not visible in FIG. 1) is constructed in the same manner, and its corresponding parts as shown in FIG. 2 have been designated with the same numerals to which a prime mark has been added. Between some or all of the pairs of struts, such as 14, 14', 16, 16' extend crosswise braces such as 18, and these are connected to respective longitudinal rails 20, 22 which hence parallel the frame bars 10 and 12 (and the direction or axis of conveyor travel), but lie at an intermediate height level; below frame bar 10 but above frame bar 12' in FIG. 1.

Also extending generally lengthwise of the conveyor section, both in the vertical sense and with respect to the cross-wise direction, is a channel or track 24, connected to and supported by the crosswise braces 18. This channel 24 opens upwardly, and serves to guide and support the usual chain 26 carrying at spaced points along its length the bale-driving dogs 28, and driven in the direction indicated by an arrow in FIGS. 1 and 2, by the usual sprocket wheels and motive power source, not shown. The chain is normally an endless one, the lower return pass thereof passing from right to left in FIGS. 1 and 2, but being omitted from the drawings for clarity.

In order to accomplish the discharge of bales from the conveyor section at any desired point along its length, a carriage generally designated 30 is provided. This carriage has secured at its upper end (or its right end as positioned in FIG. 1) a crosswise bar 32 which rests upon the upper frame bars 10 and 10' and is free to slide along them. The carriage comprises also a floor portion, constituted by right and left inclined ramp sections, formed of sheet metal or other plate-like material, and designated by numerals 34 and 36. Connecting these ramps, in the region centrally therebetween, is a depressed portion 38, forming a guide channel for chain 26, which thus rises out of its usual channel or track 24 in the region occupied by the carriage, as shown in FIG. 1, and passes upward between the ramps in the alternate channel 38, and finally over the uppermost portion of this channel 38 where it merges with the crosswise bar 32, and thence downwardly again into channel or track 24. It is obvious, from the foregoing, that the carriage as a whole can be slid along the upper frame bars to any desired position lengthwise of the conveyor section. To facilitate this motion, one end of crosswise bar 32 carries a ring 40 to which are connected the control ropes 42, 44, that pass if desired through pulley blocks mounted near the ends of the conveyor section. By a leftwise pull on rope 42 (FIG. 2) with the other rope free, the carriage will be moved to the left along the conveyor section, and by a rightwise pull on rope 44 (rope 42 being free) the carriage can be moved to the right. Single rope control is also feasible, the friction drag of chain 26 along channel 38 serving to furnish rightward propulsion if desired.

Intermediate the length of each ramp section 34 and 36, there is hinged thereto as at 46, 48 (and along a diagonal axis as clearly shown in FIG. 2) a respective diverter section 50, 52. These sections are formed with down-turned side flanges adapted, when the diverters are lowered, to lie along side the lengthwise edges of the ramp sections 34 and 36, which edges are also downwardly flanged as indicated in FIG. 3 at 54 near the end of crosswise bar 32, and at 56 where the inner edges merge into the channel 38. The ramps are connected to bar 32 as by welding at these points. Thus, when the diverter sections are in their lower positions, they constitute substantially flush portions of the ramps, actually overlying the upper ramp surfaces as shown, but presenting no impedance to the free upward passage of a bale or the like along the ramps.

However, one or the other of the diverter sections is always in its raised or tipped-up position. Section 52 is shown raised in FIGS. 1 and 2, while FIG. 3 illustrates the device when section 50 is the one that is raised. Due to the angulation of the hinge axes at 46 and 48 with respect to the lengthwise axis of the conveyor, when a diverter section is raised, it forms an upwardly open dihedral with the corresponding ramp-section, facing both upwardly and laterally of the conveyor's central axis, to raise and also to tip the forward end of the approaching bale, to one side or the other of the conveyor frame. A bale which has commenced this raising and tipping motion is indicated at numeral 58 (FIG. 1). It is clear that further progress of the bale in the direction to the right, in FIG. 1, will tip it entirely off of the far side of the conveyor frame.

The means by which the selective raising of the diverter sections is accomplished will now be described. As shown in FIGS. 1 and 2, the diverter sections are long enough to extend slightly beyond (to the right of) the upper ends of their corresponding ramp sections 34, 36. Turning now to FIGS. 3 and 4, it will be noted that the underside of each diverter section, where it will overhang the corresponding ramp section, has secured thereto a bracket such as 60. A pair of crank arms 62, 64 are pivoted at one end of each to the respective brackets, and their opposite ends are both freely pivoted as by bolt 66 to a sleeve 68 which is both slidable along, and slightly rotatable about, a cylindrical guide or shaft 70, carried at its ends by arms 72, 74 welded to the crosswise bar 32 just inside the upper frame bars 10, 10'. These arms 72 and 74, the shaft 70, and sleeve 68 are thus carried by, and move with, the carriage 30 when its longitudinal position is changed.

Arms 72 and 74 (see the latter one in FIG. 4) are canted rearwardly and downwardly from the crosswise bar 32, so that the cranks 62 and 64 will clear the upper ends of the ramp sections in passing from the sleeve 68 to the brackets 60. Also, since one or the other of the cranks always has to extend generally crosswise of the carriage, as indicated by the crank arm 64 position in FIG. 3, the bent or cranked shape thereof prevents interference of the arms with the chain 26. As shown in FIG. 1, the crank arms actually operate in the vertical space between the channel 24 and the downward sweep of the chain 26 to the right of the carriage 30. FIG. 3 also shows that the arm 64, in its position as shown, passes beneath chain 26 but above channel 24.

With sleeve 68 at the right end of its travel, arm 62 is raised and so is the diverter section 50. When sleeve 68 moves to the left end of its travel, limited by arm 72, the arm 64 and diverter section 52 will be raised, and the opposite parts lowered. This crosswise movement of sleeve 68 is conveniently controlled by a rope or ropes 76, connected to a ring 78 on the sleeve 68, and passing through suitable guides 80, 82 on the ends of the crosswise bar 32.

From the foregoing, it will be understood that the position of the carriage 30 determines the point along the conveyor at which discharge of bales will occur, and that the crosswise position of sleeve 68 determines whether the bales will be diverted to fall from the left or the right side of the conveyor. The ramp sections 34 and 36 are relatively wide, nearly filling the spaces available on either side of the chain 26, so that bales will be guided upwardly along them without damaging the bales or any binding wires that are present. Similarly, when a bale reaches the upwardly-tilted diverter section (50 or 52), its leading lower corner will encounter another wide, flat surface, and be lifted up without damage as the chain continues to urge the bale forward, the chain dog keeping contact with the rear lower edge of the bale until the bale topples over as described.

Other advantages of the invention will be obvious to those skilled in the art, as will various modifications of the specific arrangement shown, and which may be adopted without departing from the scope of the appended claim.

What is claimed is:

A bale conveyor comprising a generally elongated frame including side rails spaced apart crosswise of said frame, a diverter carriage mounted on said frame for sliding movement lengthwise thereof, said carriage including a transverse bar having its ends resting slidably upon said rails, an inclined ramp structure supported at one end on said bar and providing a rising floor for articles such as bales being conveyed along said conveyor, a pair of diverter sections hingedly connected to the right and left halves of said ramp structure upon hinge axes passing diagonally across said halves, whereby said diverter sections form essentially coplanar continuations of said ramp's surface when in their lowered positions, but form diagonally canted upward extensions of said surface when in their respective raised positions, a cylindrical shaft secured parallel to and beneath said bar, a sleeve slidable on said shaft, a pair of diverter-control arms connected to said respective diverter sections and both pivotally connected to said sleeve, the lengths of said arms being such as to alternately raise and lower the respective diverter sections as said sleeve traverses from end to end of said shaft, and a pair of control ropes extending from said sleeve through guides at the opposite ends of said transverse bar for controlling the position of said sleeve.

References Cited by the Examiner

UNITED STATES PATENTS 2,673,639   3/1954   Mayrath _____ 198—120.5
3,139,971   7/1964   Smoker _____ 198—185

EVON C. BLUNK, *Primary Examiner.*

RICHARD E. AEGERTER, *Examiner.*